(12) United States Patent
Mostak et al.

(10) Patent No.: US 10,157,442 B1
(45) Date of Patent: Dec. 18, 2018

(54) SYSTEM AND METHOD FOR PERFORMING QUERIES AND DISPLAYING VISUAL REPRESENTATIONS OF THEIR RESULTS USING GRAPHICS PROCESSING UNITS

(71) Applicant: MapD Technologies, Inc., San Francisco, CA (US)

(72) Inventors: Todd L. Mostak, San Francisco, CA (US); Christopher Root, Mill Valley, CA (US)

(73) Assignee: OmniSci, Inc., San Francisco, CA (US)

( * ) Notice: Subject to any disclaimer, the term of this patent is extended or adjusted under 35 U.S.C. 154(b) by 0 days.

(21) Appl. No.: 15/409,470

(22) Filed: Jan. 18, 2017

Related U.S. Application Data

(60) Provisional application No. 62/280,098, filed on Jan. 18, 2016.

(51) Int. Cl.
G06T 1/20 (2006.01)
G09G 5/36 (2006.01)
G06T 1/60 (2006.01)

(52) U.S. Cl.
CPC .............. *G06T 1/20* (2013.01); *G06T 1/60* (2013.01); *G09G 5/363* (2013.01)

(58) Field of Classification Search
CPC ........ G09G 5/363; G06T 1/20; G06T 2210/52
USPC ........................................ 345/501, 502, 505
See application file for complete search history.

(56) References Cited

U.S. PATENT DOCUMENTS 7,015,915 B1 * 3/2006 Diard .................. G06F 15/8007
345/505
7,525,547 B1 * 4/2009 Diard ....................... G06T 1/20
345/502

* cited by examiner

*Primary Examiner* — Jacinta M Crawford
(74) *Attorney, Agent, or Firm* — Innovation Partners; Charles E. Gotlieb

(57) ABSTRACT

A system and method runs a query using a GPU and generates a visualization of the query using the same GPU.

8 Claims, 6 Drawing Sheets

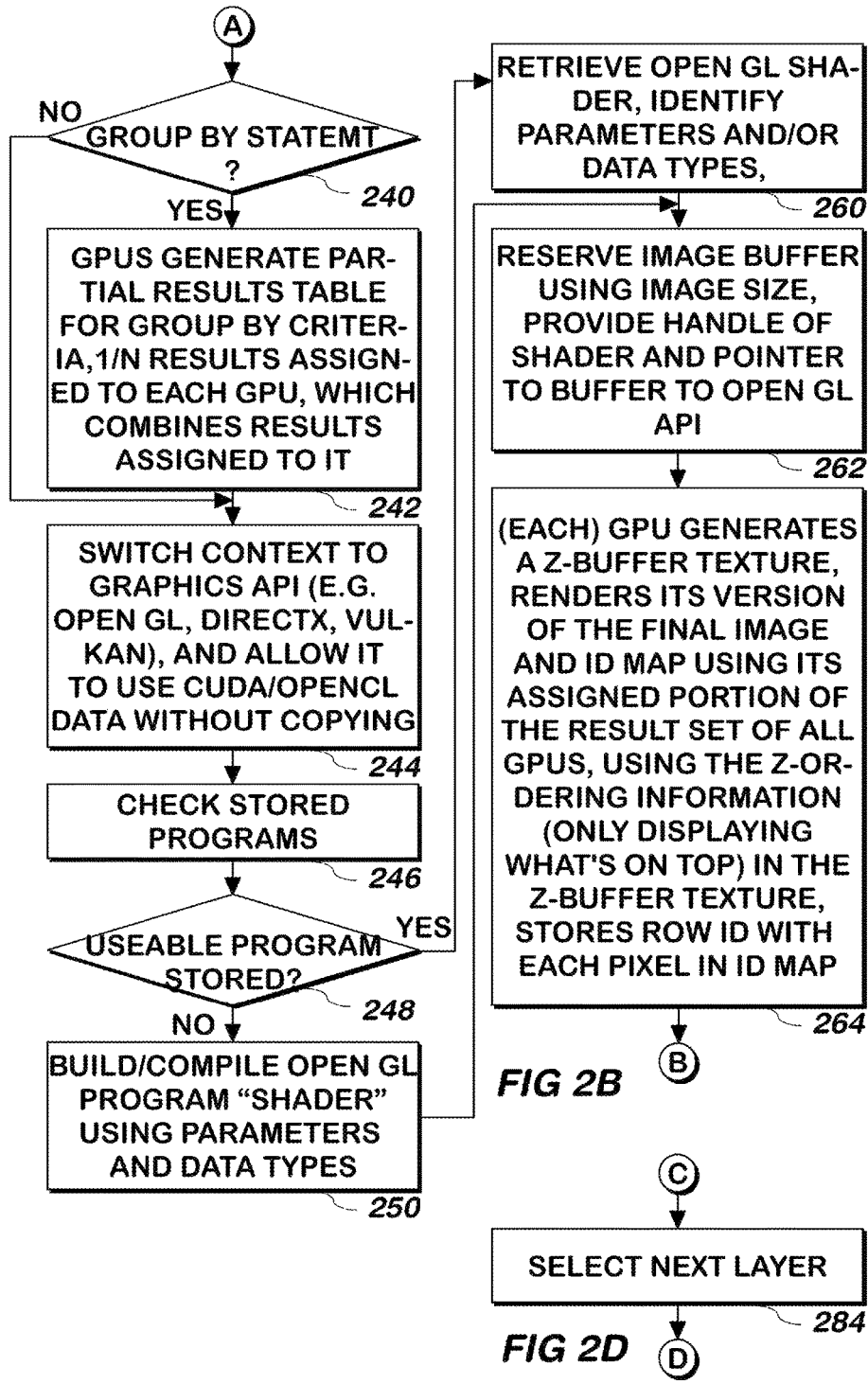

SYSTEM AND METHOD FOR PERFORMING QUERIES AND DISPLAYING VISUAL REPRESENTATIONS OF THEIR RESULTS USING GRAPHICS PROCESSING UNITS

RELATED APPLICATION

This application claims the benefit of U.S. Provisional Patent Application Ser. No. 62/280,098, entitled, "Method and Apparatus for Performing Queries and Displaying Visual Representations of Their Results Using Graphics Processing Units" filed by Todd Mostak on Jan. 18, 2016, having the same assignee as the present application and is hereby incorporated by reference in its entirety.

FIELD OF THE INVENTION

The present invention is related to computer hardware and software and more specifically to computer hardware and software for performing queries and displaying visual representations of the results of such queries.

BACKGROUND OF THE INVENTION

Traditional queries are run on CPUs and then may be converted to visual representations on the CPUs, to be rendered by the CPUs and/or GPUs. Such methods are suboptimal. What is needed is a system and method for improved query implementation and visualization of the results of such queries.

SUMMARY OF INVENTION

A system and method receives a request, for example, via an API it provides, along with parameters, that describe how to create a visualization of data corresponding to one or more data sources and queries that are included with the request, which may specify one or more layers. The system and method employs multiple conventional graphics processing units (GPUs), as may be resident on one or more conventional graphics cards and one or more central processing units (CPUs, which may be referred to as 'cores') of the processor on the motherboard onto which the graphics card or cards are plugged in or with which they are otherwise communicating.

A layer is selected and processing proceeds one layer at a time, from the bottom most layer to the top, as will now be described for each layer. The data referenced in the request (i.e. the columns referenced) is further narrowed, if possible, using metadata. The resulting data is already partitioned to store the data in long term storage (e.g. SSD) and such partitioning is retained for use in CPU and GPU memory, each partition is assigned to one of several GPUs and one of one or more CPUs, the partitions and assignments, as well as the one or more queries and parameters, are distributed to the GPUs, and the data partitions not in or not fully in GPU storage are requested by the GPUs to which the partitions were assigned from the CPU or CPUs to which each partition was assigned, or retrieved directly by the GPUs from long term storage. The CPUs provide such parameters from a buffer pool in CPU memory if resident there, and if not resident, the CPUs obtain it from long term storage, such as SSD or disk. If all of the data is in GPU storage, the partitions and assignments from the last use may be reused, or the data may be reassigned as described above and herein.

The GPUs then run the one or more queries against the partitions of the one or more data sources assigned to them. If there is a "group-by" clause in the query, the results are reduced, wherein each GPU becomes responsible for combining the sub-results from each GPU for a particular set of group-by keys, and the results are combined, including computing one or more aggregate functions (e.g. count, min/max, etc.), or one GPU combines the results and performs all of the remaining processing. A context switch is then made to OpenGL or other graphics API in a manner that allows the graphics API to use the result set without copying it elsewhere.

A determination is made as to whether existing OpenGL shader programs, or other similar programs, can be used to render the visualization as described by render parameters of the request and the types of the result set, and if not, one or more new shader programs are constructed and the one or more shader programs are compiled according to the parameters and types via a templated shader generation framework. An output framebuffer is reserved and a handle to, or other identifier of, the shader and a pointer to the framebuffer is provided to the OpenGL API for rendering. Each GPU runs the shader program using OpenGL or other graphics API, which renders its version of the final image by using a Z-buffer texture (only rendering the top data point according to the Z-buffer texture if there are multiple data points defined at the same pixel location), and generates an ID map that maps each pixel in the final image to a row identifier of the source data, if a correspondence exists.

If the portion of the final result set assigned to each GPU overlaps or may overlap those of other GPUs, the CPU or a GPU assembles the portions into a single buffer using the Z-buffer textures for each portion to retain the highest pixel according to the Z-buffer textures, assigns a unique image identifier, and the GPU or CPU that assembles the portions performs all further processing. If there is one or more convolutional filters selected to be applied as part of the request, the sections assigned are allowed to overlap to allow adjacent data to be included in the filter and the filter is applied by each GPU. If there is no convolutional filter selected to be applied then there is no need to assign non-overlapping sections to each GPU—the single buffer described above is retained on the CPU or the GPU where it was assembled/merged/reduced.

If the portion of the final result set assigned to a GPU does not overlap the portion assigned to the other GPUs, if the request specified a convolutional filter to be applied to the result, the portions of the result set assigned to each GPU are expanded to include one or more rows and columns of adjacent pixels to use for the filter and the filter is applied by each GPU to the result set assigned to it.

The layer image data is composited onto a framebuffer, and then the next layer is processed as described above until all layers specified by the request, which may be in the form of an API call, have been processed.

A CPU then uses a conventional library to compress the framebuffer into an image (after the buffer is moved from GPU memory to CPU memory), or a GPU may use the hardware capabilities of the graphics card on which the GPUs reside to generate a frame of an animation, with one frame generated for each request, and the image or frame is sent to a browser or navigation program, such as the one that provided the request. In the case of a navigation program, the image identifier is sent with the image or frame and the ID map is saved associated with the image identifier and source data identifier.

The browser or navigation program displays the image or animation frame, and detects if the user is hovering over a pixel of the image or frame or clicks on a pixel. If so, it provides to the CPU the image identifier and the hover or click pixel coordinates and optionally an identifier of the column or columns corresponding to the hovering or clicking, and the CPU looks up the row identifier from the ID map using the pixel coordinates and requests that row from the database. The data or indicated data from the requested row is provided to the navigation program, which displays the data.

DETAILED DESCRIPTION OF A PREFERRED EMBODIMENT

Figure 1:
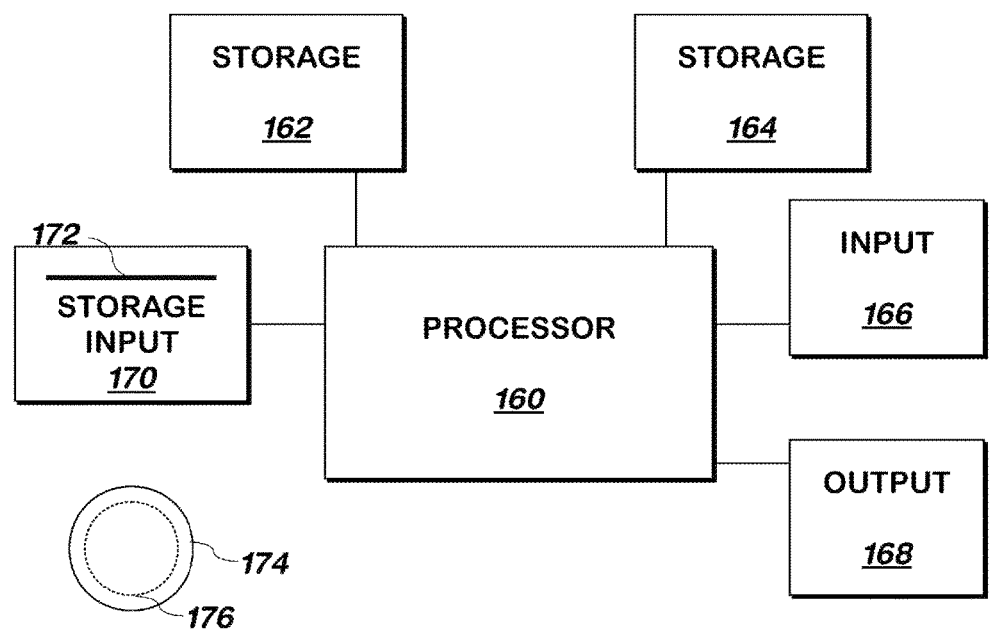
FIG. 1 is a block schematic diagram of a conventional computer system.

The present invention may be implemented as computer software running on a conventional computer system, computer software embodied on a non-transitory storage media, or otherwise. Referring now to FIG. 1, a conventional computer system 150 for practicing the present invention is shown. Processor 160 retrieves and executes software instructions stored in storage 162 such as memory, which may be Random Access Memory (RAM) and may control other components to perform the present invention. Storage 162 may be used to store program instructions or data or both. Storage 164, such as a computer disk drive or other nonvolatile storage, may provide storage of data or program instructions. In one embodiment, storage 164 provides longer term storage of instructions and data, with storage 162 providing storage for data or instructions that may only be required for a shorter time than that of storage 164. All storage elements described herein may include conventional memory and/or disk storage and may include a conventional database. All elements of a system include any or all of at least one input, at least one output and at least one input/output. Other system elements may include a conventional processor.

Input device 166 such as a computer keyboard or mouse or both allows user input to the system 150. Output 168, such as a display or printer, allows the system to provide information such as instructions, data or other information to the user of the system 150. Storage input device 170 such as a conventional floppy disk drive or CD-ROM drive accepts via input 172 computer program products 174 such as a conventional floppy disk or CD-ROM or other nonvolatile storage media that may be used to transport computer instructions or data to the system 150. Computer program product 174 has encoded thereon computer readable program code devices 176, such as magnetic charges in the case of a floppy disk or optical encodings in the case of a CD-ROM which are encoded as program instructions, data or both to configure the computer system 150 to operate as described below.

In one embodiment, each computer system 150 is a conventional SUN MICROSYSTEMS T SERIES SERVER running the ORACLE SOLARIS 11 or higher operating system commercially available from ORACLE CORPORATION of Redwood Shores, Calif., a PENTIUM-compatible personal computer system such as are available from DELL COMPUTER CORPORATION of Round Rock, Tex. running a version of the WINDOWS operating system (such as XP, VISTA, 7 or 8) commercially available from MICROSOFT Corporation of Redmond Wash. or a Macintosh computer system running the OS X operating system commercially available from APPLE INCORPORATED of Cupertino, Calif. and the FIREFOX browser commercially available from MOZILLA FOUNDATION of Mountain View, Calif. or INTERNET EXPLORER browser commercially available from MICROSOFT above, although other systems may be used. Each computer system 150 may be a SAMSUNG GALAXY S5 commercially available from SAMSUNG ELECTRONICS GLOBAL of Seoul, South Korea running the ANDROID operating system commercially available from GOOGLE, INC. of Mountain View, Calif. Various computer systems may be employed, with the various computer systems communicating with one another via the Internet, a conventional cellular telephone network, an Ethernet network, or all of these.

Figure 2A:
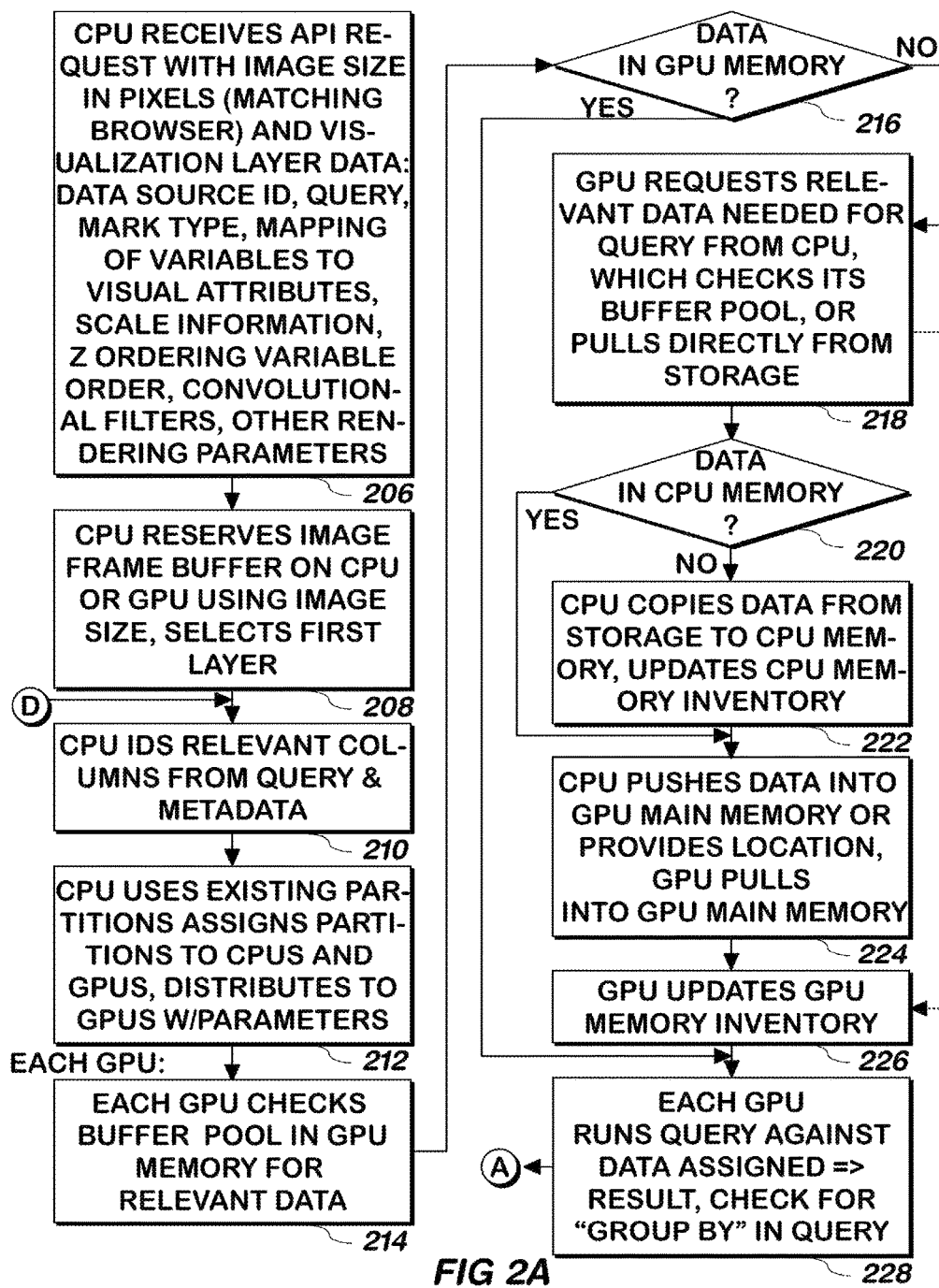
FIG. 2, consisting of FIG. 2A, FIG. 2B, FIG. 2C and FIG. 2D, is a flowchart illustrating a method of performing a query and providing a visualization of the query result using a set of multiple GPUs according to one embodiment of the present invention.
Figure 2C:
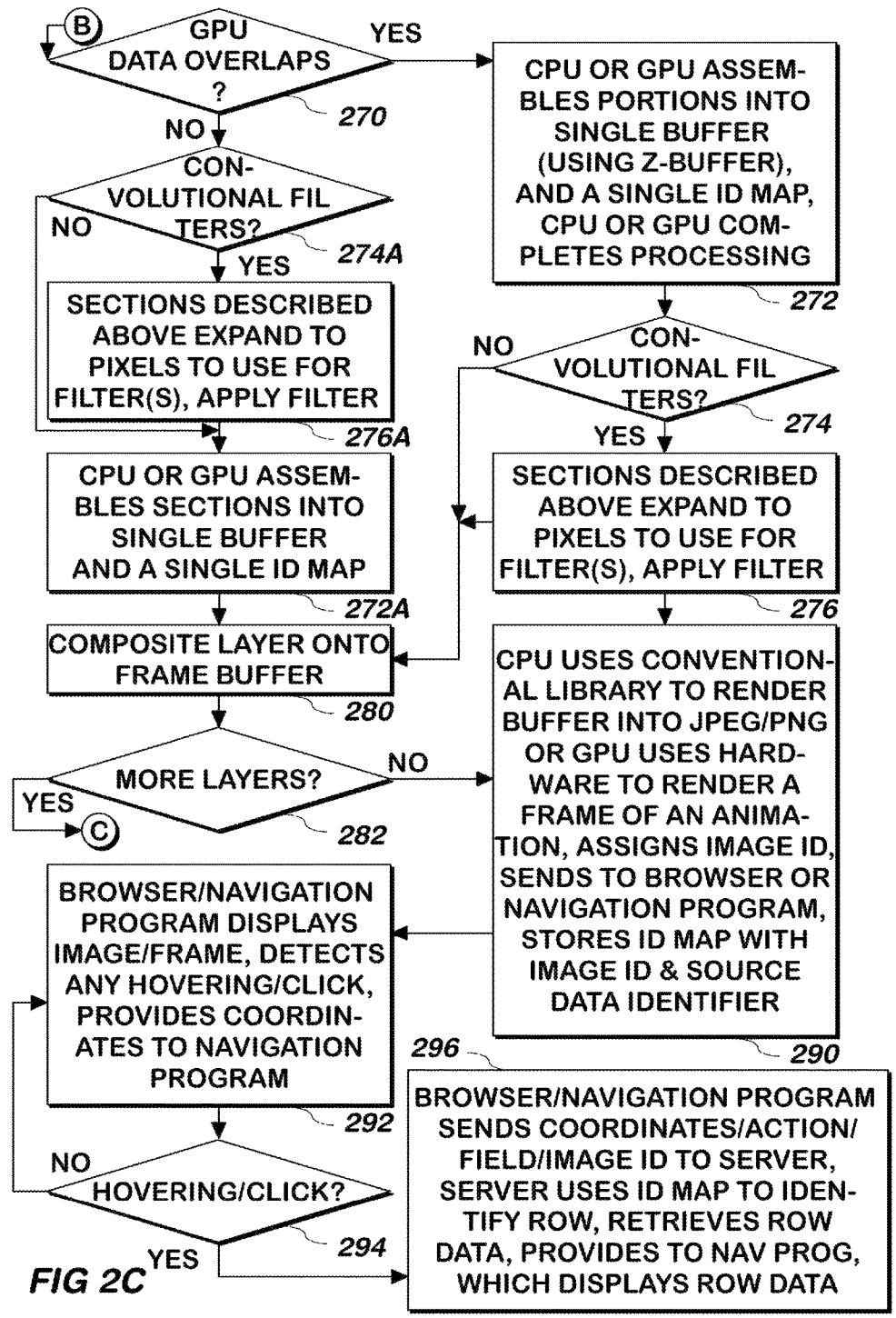

Referring now to FIG. 2, a method of creating an image or animation frame of a visualization of one or more queries is shown according to one embodiment of the present invention. An API call to convert one or more queries of a database or other set of data into an image or animation frame is received by a CPU that is coupled to an on-board GPU 206. Although an API call is used in one embodiment, any other type of request may be used instead. A GPU is a graphics processor unit, of which there may be several on one circuit board plugged into a bus of a central processing unit, or CPU or otherwise communicating with it. Each CPU may be an individual processor or may be a core in a multi-core processing unit. In one embodiment, the API call includes the size of the image displaying the result, in pixel height and width (which can be a function of the size of the browser window or other area within which the image will be displayed), and parameters for each one or more layer of the visualization the user specifies via the API call. The parameters for each layer are described in more detail below: the query and an identifier of the data source against which the query is to be run, an indication of how the results are to be displayed, e.g. using points, lines, polygons or image sprites, a mapping of the variables to visual attributes, scale information, a Z-ordering variable order (described in more detail below) and other rendering parameters described below.

The CPU identifies whether assembly of the multiple layers will be done on CPU or a GPU and reserves a framebuffer in storage on that CPU or GPU to store the assembled image and id map and a first layer is selected 208. In one embodiment, the layers are selected starting with the bottom layer and working towards the top.

In one embodiment, as part of step 208, a single primary GPU is configured to perform the assembly/composite as the primary GPU. In another embodiment, a primary GPU is automatically determined based on available GPU memory, ensuring the GPU with the largest available memory is assigned as the primary GPU. If insufficient memory is available on any GPU to perform the assembly/composite described herein and perform the other functions, a CPU with sufficient memory to perform the compositing is selected as the primary CPU and that CPU performs such assembly/composite functions instead of a GPU. Such determination of the memory required may be made using the image size. Processing then continues for the selected layer.

The CPU identifies the columns of the data source relevant to the query associated with the layer 210. In one embodiment, all columns specified in the query are relevant. In another embodiment, metadata that describes the data source may be used to limit the relevant columns. For example, if the metadata specifies the minimum and maximum values in each column, and a where clause of the query received requires a value of a column entirely outside of those limits, the column and the columns corresponding to the clause are eliminated from those columns considered to be relevant to the query.

Also as part of step 210, the CPU assigns partitions of the data to each of the several GPUs, the partitioning having been performed when the data was stored into long term storage prior to receipt of the API call. Such partitioning is retained.

In one embodiment, the metadata of the source data that describes the number of rows of data from the data source and such metadata, or the data itself, may be used to determine how to partition the data into a set of partitions, optionally with an approximately equal number of rows per partition. For example, the data may be partitioned according to a column, optionally specified as a parameter received with the request, with values of that column that are the same or otherwise logically related (e.g. those from the same metropolitan area) grouped together into the same partition (e.g. those rows having the same "location" value may be part of the same partition), or, as noted, partitioning used to store the data source on disk or SSD may be retained and used as the partitions.

Each partition is assigned to one GPU so that each GPU has an approximately equal number of partitions or an approximately equal amount of data (for example by assigning them in a round robin fashion or another fashion) and the partitions are also assigned to each CPU that can be used to retrieve the data the GPUs don't already have in GPU memory so that each CPU is assigned an approximately equal number of partitions, the partition boundaries and assignments may be stored, and the assignments of partitions and relevant columns (if the data is not partitioned on column boundaries) are distributed to the GPUs, along with the API parameters received 212.

When it receives such information, each GPU performs steps 214-220 and part of step 224, step 226 and step 228 as will now be described. The GPU checks an inventory of a buffer pool held in GPU memory for all GPUs, to determine if the one or more columns from the data source relevant to the query for the partitions assigned to the GPU is in GPU main memory 214. In one embodiment, GPU main memory and CPU memory operate as a two level cache from disk or SSDs or other long term storage, with the GPU main memory being the lowest level. When space is needed in one level of the cache, the oldest referenced data from the data source in that level of the cache is overwritten in the cache, with each level operating independently due to the larger amount of CPU memory as compared with GPU memory. An inventory of the contents of each level of the "cache" and last date and time such data was referenced are maintained to allow the determination to be made.

If not all of the columns from the data source that are relevant to the query for the partitions assigned to the GPU are in the GPU memory 216, the GPU requests the data that is relevant to the query but is not already in GPU memory from the CPU assigned to the missing partition or partitions in one embodiment, and in another embodiment, pulls such data directly from long term storage (long term storage is non-volatile storage such as disk or SSD, even if the data stored therein has not been stored long term) 218. In the embodiment in which the GPUs pulls from storage the data relevant to the query that is not in GPU memory, the method continues at step 226, and otherwise, the method continues at step 220. In the embodiment in which such data is requested from the CPU, the CPU checks its data storage inventory to determine if the data is in a buffer pool in CPU memory as part of step 218.

At step 220, if the requested data is not in CPU memory, the CPU receiving the request copies the requested data from long term storage (e.g. disk or SSD) into CPU memory and updates the inventory of data in CPU memory to include the copied data, and the method continues at step 222. If the data is in CPU memory 220, the method continues at step 222. Because the GPUs and CPUs can operate relatively independently of one another, the data may be retrieved by multiple GPUs and CPUs at the same, or nearly the same, time.

At step 224, in one embodiment, the CPU pushes the requested data into GPU main memory or provides the location in CPU memory and the requesting GPU pulls the data from CPU memory into GPU memory. The GPU updates the data inventory of GPU memory (with information including the name of the data source, version of the data source, and columns stored), accounting for the new data and the data that may have been overwritten 226. In the embodiment in which the CPU pushes the data into GPU memory, the GPU may instruct the CPU where it is to be stored when it requests the data as part of step 218. The method continues at step 228.

In one embodiment, if the GPU that receives the API request determines that all of the relevant data is in GPU memory 214, the method continues at step 228.

At step 228, each GPU runs the query for the selected layer from the API against the data in the GPU memory for the selected layer assigned to that GPU and checks the query for a "group by" statement in the query for the selected layer. In one embodiment, the GPU receiving the API request performs this check and provides to the GPUs with the information from the request a flag indicating such statement is part of the query received with the request, and the GPUs check this flag. Queries are run on AMD GPUs using OpenCL and on NVidia GPUs using CUDA in one embodiment.

Referring now to FIG. 2B, if there is no "group by" statement in the query for the selected layer 240, the method continues at step 244 and otherwise 240, at step 242 the GPUs each generate a hash table for the group by criteria (e.g. if the results are grouped by state, a hash of the result set is made by hashing the value of the state column) building a Partial Results table for the group by query with the hash result and a pointer to the portion of the result that corresponds to that hash result in GPU memory, and providing a pointer to the hash table to a central repository.

In one embodiment, one of the GPUs then combines the hash tables into a single table, sorts the single table by hash result, and then that GPU performs all further rendering steps for the selected layer, described below as being performed by one or more GPUs.

In another embodiment, each of the N GPUs assigns to itself approximately 1/N of each hash table, where N is the number of GPUs. Thus, if there are 50 states and 16 GPUs, each GPU would be assigned the hash results of about 3 states. Each GPU combines the assigned hash results with its own identified hash results and renders such information. Combining may include at least one aggregation function, such as counting, summing, averaging, identifying the minimum and/or maximum, or standard deviation. All such actions are performed as part of step 242.

For example, if the query identifies a number of tweets from each state, and there are 16 GPUs, each of 16 GPUs could initially generate a Partial Results set that has the number of tweets from each state from the partitions assigned to it, and a hash result of the state name or identifier. The number of tweets and hash of the name of the state are added to the hash table, and combined, and one GPU may be assigned the first three states. That GPU would then add the number of tweets from Alabama from each of the 16 entries provided by the 16 GPUs into the combined table, and repeat the process for Alaska and Arizona. The other GPUs would do the same for the 3 or 4 states they were assigned. The GPUs would at that point disregard their partition assignments and continue processing based on their 'group by' assignments.

Each GPU then switches context to allow it to run a graphics API such as OpenGL, DirectX or Vulcan, in a manner that allows it to use the data from the language used for the query (either OpenCL or CUDA) without requiring the data be copied 244.

To do so using OpenGL and CUDA, in one embodiment, the conventional cuGraphicsGLRegisterBuffer call is used to register an OpenGL buffer for CUDA use when the buffer is initialized. The conventional cuGraphicsMapResources call is used to map that buffer from GL to CUDA. The cuGraphicsUnmapResources call is used to unmap the buffer from CUDA to be used by OpenGL and the conventional cuGraphicsUnregisterResource call is used to unregister the buffer when the buffer is deleted.

A set of prewritten programs known as shader programs is checked to determine whether a shader program available to be run under the graphics API or otherwise operated, which may be referred to as a "shader", exists that can be used to render the data as specified in the API call for the selected layer. In one embodiment, some layer types (points, lines, polygons and sprites) received with requests that are commonly received can be grouped, and a general purpose program can be written that renders all layers of any of those types. The differences are resolved through the data types of the result set used to drive the selected layer's rendering attributes and/or the addition/deletion/modification of the scales used by the layer.

A table of shader programs, mapped by input and scale types, is provided for each of the layer types. Thus, in step 246, the table is consulted to see if a shader program corresponding to the layer parameters and type of result set data is stored, and if so the parameters to employ are retrieved from the table. The parameters may be actual parameters to be provided to the program to change its operation to suit the layer parameters.

If there is no program stored that can be used to render the result set in accordance with the request 248, a new one is written and compiled using the data types of the result set for the selected layer and the render parameters of the layer 250, and the method continues at step 262. Shaders are described at numerous web sites located by searching "How to write shaders opengl" (or substituting the name of the graphics API for 'opengl' in the search above, including the web site duriansoftware dot com/joe/An-intro-to-modern-OpenGL.-Chapter-2.2:-Shaders.html). A description is also listed in Appendix A. Otherwise 248, any parameters are identified for the corresponding program to cause it to properly process the type or types of data in the result set in accordance with the layer parameters and the shader program's input attributes are modified, for example using the parameters 260. The method continues at step 262.

At step 262, an image buffer for the layer is reserved in memory using the image size from the request of step 210 and a handle to, or other identifier of, the shader of steps 250 or 260 and a pointer to the buffer are provided to the OpenGL or other graphics API by each GPU.

The GPU causes the OpenGL software to run the shader program to generate a version of the image using a Z-buffer texture for the layer from the API call that describes the Z-axis location of each row in the result set assigned to it using the Z-ordering attribute from the current layer's render properties described in the API call received in the corresponding layer properties of step 206 and to render a version of the final image using whatever result set assigned to it (if the result set is not reassigned as described above, the result set assigned to a GPU is the result set the GPU generated) 264. Depending how the data was partitioned, two or more different GPUs may render the exact same pixel location, which will be resolved using the Z-buffer texture. The Z-buffer texture identifies the height of the pixel, so to resolve two pixels in the same pixel location using the Z-buffer texture or textures, the pixel with the highest Z buffer value is selected for the rendering and the other one is not used. The version rendered by one GPU only has one row of the result set rendered for each pixel or set of pixels, the row corresponding to the topmost z-ordering variable. For each such pixel rendered, the row identifier of the row to which the pixel corresponds is also provided in an ID map by and for each GPU as part of step 264. In one embodiment, the row identifier is inferred from its position in the file, with the first row received before the first row delimiter being row zero, and so on. The method continues at step 270 of FIG. 2C.

At step 270, if the parameters for the API indicate that the version of the image for the selected layer built by each GPU may overlap in the final rendered image (i.e. the image data from various GPUs may have the same X and Y coordinates), the data from the various GPUs is assembled (by the primary GPU or CPU determined as described above with respect to step 208) into a single buffer using the Z buffer information to provide only the top most pixel in the buffer and that single buffer is then processed by that GPU or CPU 272. In one embodiment, the versions (i.e. sections) of the images are assumed to always overlap unless the parameters indicate that a heat map is being produced, as indicated by a group by of X and Y bins. If convolutional filters are to be applied to the image data for the selected layer as specified by the API call 274, the filters are applied, and may be applied after the sections are expanded to allow each GPU to have access to a part of any adjacent area to use for applying the filters (in one embodiment, this expansion is not performed in this step as only a single GPU is applying the filters and has access to all of the results) and the filters are applied to the data corresponding to the selected layer by the GPU 276. The method continues at step 290. In one embodiment, the sections are originally assigned with their expanded boundaries if convolutional filters are to be applied, instead of assigning and expanding them.

If there are no convolutional filters specified to be applied to the selected layer in the API 274, the method continues at step 280.

If the parameters for the API indicate that the version of the image generated for the selected layer by each GPU will not overlap in the final rendered image 270, if there are convolutional filters to be applied to the selected layer 274A as noted in step 274, portions of the images from other GPUs that are adjacent to each GPU are also assigned to such GPU to allow access by that GPU of the data assigned to another GPU that is nearby so that the filters can take into account such nearby data 276A and the filters are applied by each of the GPUs (though in one embodiment, the additional expansions are not included in the filtered result, they are just used to modify the image area originally assigned) 276A. The various GPUs may then indicate to the GPU that received the request that they are ready to process another request or query from the same request as part of step 276A or 276. A CPU or a GPU assembles the sections into a single buffer and a single ID map, (ignoring the expanded portions of the sections if they were included in the filtered result) 272A. If the CPU is used, a GPU or the CPU copies the sections into CPU memory. The method continues at step 280.

The above processing uses the image buffer. At step 280, the assembled image buffer for the layer is composited onto the final image framebuffer created in 208. The image buffer may be returned to the memory pool or may be retained and reused for additional layers instead of reserving it each time. If there are more layers not previously selected 282, the next highest layer from the API call is selected 284 (FIG. 2D) and the method continues at step 210 using the newly selected layer. If there are no more layers 282, the method continues at step 290.

The CPU or GPU selected as the primary CPU or GPU as described above runs a conventional image compression library on the final image framebuffer to generate an image that can be displayed by a browser 290. If the buffer is in GPU memory, a GPU or the CPU copies it into CPU memory. The compressed image may be a conventional JPEG or PNG image or other conventional graphics image. Alternatively, the GPU can render the buffer into a frame of an animation in any conventional format using hardware capabilities of the graphics card on which the GPU resides. A unique image identifier is assigned to allow the image to be referenced as described below. The image or frame and image identifier are sent to a browser or navigation program from which the request was received, and the image identifier and ID map provided to the CPU (if rendered by the GPU) are stored on the CPU, associated with one another and with an identifier of the source data.

The browser and/or navigation program displays the image or frame, and in the case of a navigation program, detects any hovering or the user clicking into a pixel on the image. The navigation program may be running under the browser, in which case the browser detects the hovering or clicking and provides the hover coordinates, and optionally an indication that the user hovered or that the user clicked, to the navigation program 292.

If such hovering or clicking is detected 294, the navigation program provides any or all of the coordinates, and optionally identifies the field or row hovered over or clicked on, an indication of the action performed (hover or click) and the image identifier to the CPU. The CPU uses the image identifier to locate the ID map, uses the coordinates to locate, within the ID map, the row and data source identifier and requests or otherwise obtains that row from the data source, for example from the conventional database from which the data was originally supplied, optionally providing less (e.g. only some of the data from the row) or more data depending on the action performed. Some or all of the data from the row, and optionally other data, is provided to the navigation program, which displays it to the user 296. If no hovering or clicking is detected 294 the browser/navigation program continues to attempt to detect it or receive another image and detect it 292 until the user takes an action that causes it to stop.

System.

Figure 3:
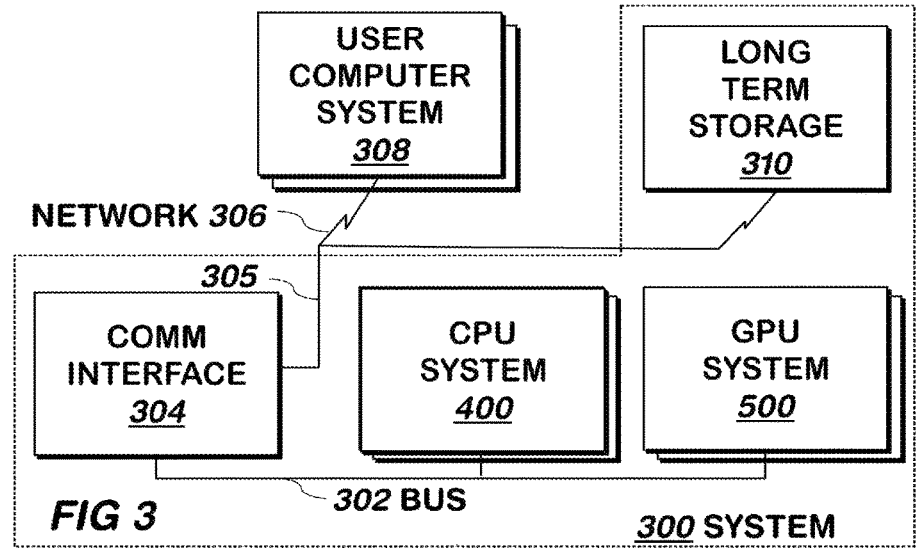
FIG. 3 is a block schematic diagram of a system for performing a query and providing a visualization of the query result using a set of multiple GPUs according to one embodiment of the present invention.

FIG. 3 is a block schematic diagram of a computer based system 300 for performing a query and providing a visualization of the query result using a set of multiple GPUs and at least one CPU according to one embodiment of the present invention. One or more CPU systems 400 is coupled to multiple GPUs 500, which may number over 100, via bus 302. Each element of GPU system 500 includes a conventional graphics processor unit commercially available from AMD or NVIDIA or other manufacturers, and running suitable graphics APIs described herein. Each element of CPU system 400 includes a conventional central processing unit commercially available from INTEL CORPORATION or AMD running a conventional rendering library. As described herein, each query is performed by multiple GPU systems 500 operating under the control of one or more CPUs, simultaneously, and then each GPU system 500 processes the query output at least part way towards generating a layer of a final image buffer and an ID map. At some point during processing, processing may be taken over by a single GPU, a CPU or both. The query and the at least part of the graphical rendering are performed by multiple GPUs simultaneously.

Communication interface 304 is a conventional communication interface running suitable communications protocols such as TCP/IP, Ethernet, or both. All communication with system 300 is made via input/output 305 of communication interface 304, which is coupled to a network 306 such as an Ethernet network, the networks of the Internet, or both.

User computer system 308 is a conventional computer system, such as a conventional personal computer system or smart device, in communication with system 300 via communication interface 304. There may be any number of user computer systems 308 communicating with system 300 at any time.

Long term storage 310 includes a conventional long term storage system, such as disk storage or solid state disk storage, and may be coupled to CPU system 400 via network 306, bus 302 or other conventional methods. Long term storage 310 may be electronically accessible to GPU system 500 as well, either via CPU system 400 or directly.

Figure 4:
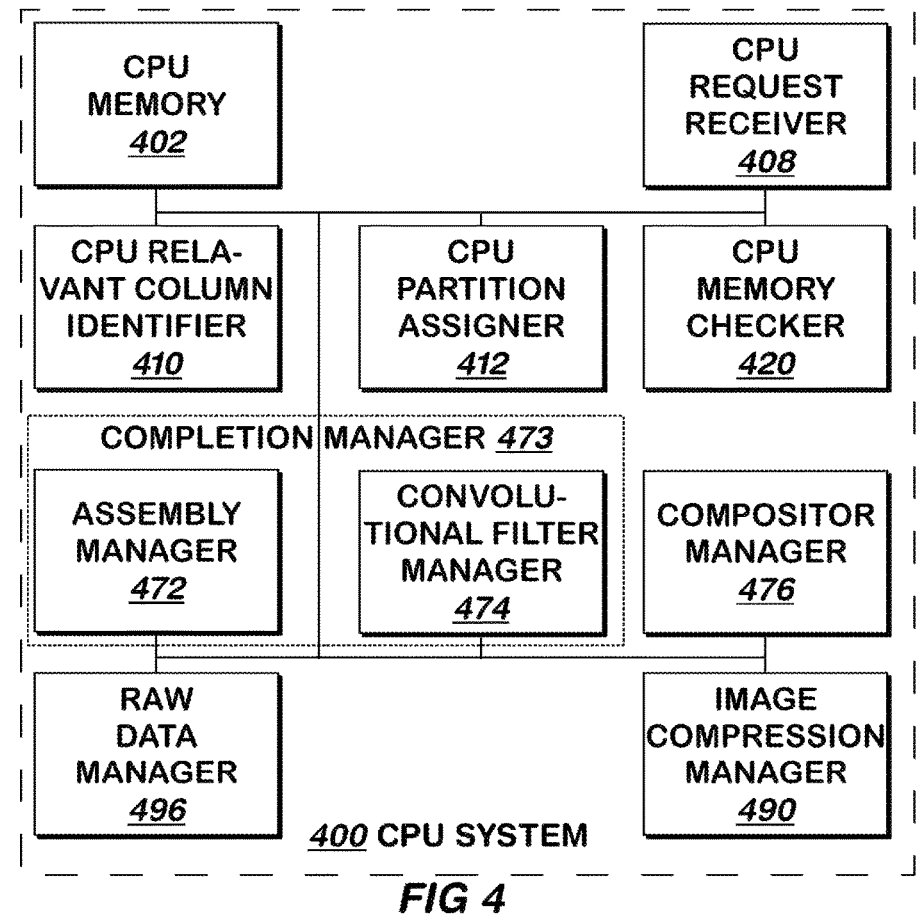
FIG. 4 is a block schematic diagram of the CPU system of FIG. 3, shown in more detail according to one embodiment of the present invention.
Figure 5:
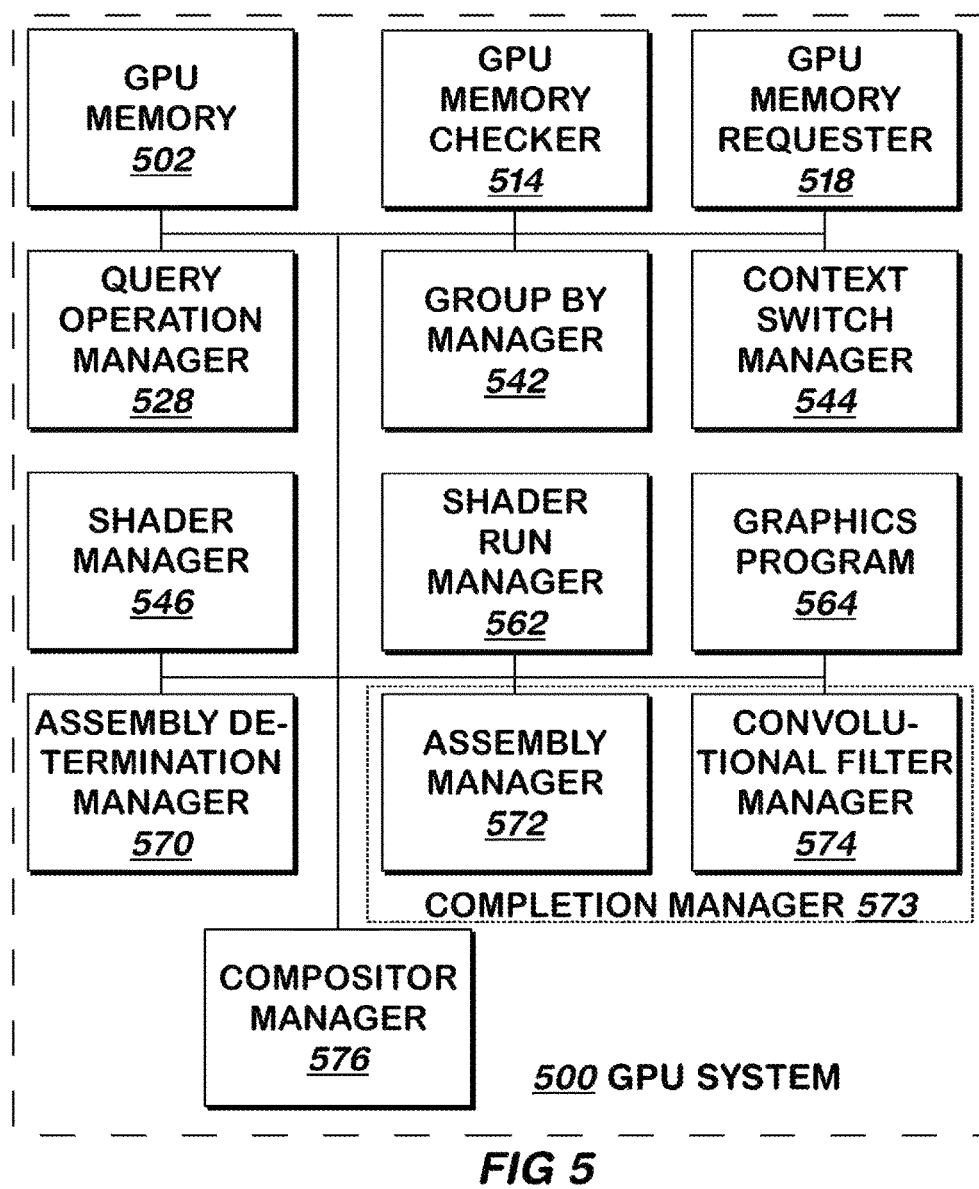
FIG. 5 is a block schematic diagram of the GPU system of FIG. 3, shown in more detail according to one embodiment of the present invention.

FIG. 4 is a block schematic diagram of the CPU system 400 of FIG. 3, shown in more detail according to one embodiment of the present invention. FIG. 5 is a block schematic diagram of the GPU system 500 of FIG. 3, shown in more detail according to one embodiment of the present invention.

Referring now to FIGS. 3, 4 and 5, CPU request receiver 408 receives the API call (also known as an API request or a request) as described above and provides the parameters from the request to CPU relevant column identifier 410. The parameters from the request includes all of the information received with request, including the query, data source identifier, and other parameters described above.

CPU request receiver 408 also identifies the primary GPU or CPU as described above and reserves the image frame buffer on the primary GPU or CPU. The primary CPU or GPU is notified of its status, and the other GPUs may also be notified of an identifier of the primary GPU or CPU by CPU request receiver 408. CPU request receiver 408 selects a first layer as described above and processed that layer as will now be described. All information described herein that is layer-dependent uses the then-currently selected layer.

When it receives the parameters, CPU relevant column identifier 410 identifies the relevant columns from the query and metadata that it retrieves from the data source using the data source identifier received as part of the parameters as described above. CPU relevant column identifier 410 provides the parameters, and identifiers of the relevant columns to CPU partition assignor 412.

When it receives the parameters, and identifiers of the relevant columns, CPU partition assignor 412 identifies the partitions in the data source corresponding to the relevant columns using either the data source or its metadata and the identifiers of the relevant columns it received, assigns the partitions corresponding to the relevant columns to each CPU and GPU as described above, and provides the parameters, identifiers of the partitions and their assignments and identifiers of the column or columns contained within each partition to the GPU memory checker 514 of each GPU. In one embodiment, a system administrator identifies to CPU partition assignor 412 the numbers of GPU's and CPUs in the system, and in another embodiment, CPU partition assignor 412 retrieves such numbers from an operating system, or retrieves information that can be used to identify such numbers from the operating system, and uses a table to determine the actual number of GPU's and/or CPUs. CPU partition assigner 412 provides such number of GPUs to GPU memory checker 514, by adding it to the parameters it provides. The system elements of each GPU then continues processing simultaneously with the others, as will not be described.

When it receives the identifiers of the partitions and the other information described above, GPU memory checker 514 checks a buffer pool inventory that each GPU memory checker 514 maintains in GPU memory 502. The buffer pool inventory identifies which partitions are stored in GPU memory 502, and the order in which the partitions were stored or otherwise accessed. As the other elements described herein access partitions, they update the inventory to reflect the access, for example by setting an index for the partition used to one higher than the highest index currently used, to indicate that the partition with the highest index was accessed most recently. If GPU memory checker 514 determines that all partitions assigned to it are in GPU memory 502, GPU memory checker 514 signals query operation manager 528 with the identifiers of the partitions, the assignments of the partitions, identifiers of the column or columns contained within each partition and the parameters. Otherwise, GPU memory checker 514 signals GPU memory requester 518 with the identifiers of the partitions, identifiers of the missing partitions, the assignments of the partitions, identifiers of the column or columns contained within each partition and the parameters.

When it receives the identifiers of the partitions, identifiers of the missing partitions, the assignments of the partitions, identifiers of the column or columns contained within each partition and the parameters, GPU memory requester 518 signals CPU memory checker 420 with the identifiers of the missing partitions. CPU memory checker 420 checks an inventory of partitions that it maintains in CPU memory 402 that is similar to the buffer pool inventory described above to determine if the missing partitions are in CPU memory 402.

If any of such partitions are not in CPU memory 402, CPU memory checker 420 provides identifiers of such partitions to CPU memory updater 422, which copies such partitions from long-term storage 310, which may include a conventional SSD, into CPU memory 402, updates the inventory accordingly, and signals CPU memory checker 420. When it receives the signal, or if all of the missing partitions are in CPU memory 402, CPU memory checker 420 pushes the missing partitions into GPU memory 502 and informs GPU memory requester 518 that it has done so (in such embodiment, GPU memory requester 518 also instructs CPU memory checker 420 where to store such partitions in GPU memory 502), or signals GPU memory requester 518 with the locations of the missing partitions, and GPU memory requester 518 pulls the missing partitions from CPU memory 402 into GPU memory 502. GPU memory requester 518 updates the buffer pool inventory in GPU memory 502 accordingly. GPU memory requester 518 signals query operation manager 528 with the identifiers of the partitions, the assignments of the partitions, identifiers of the column or columns contained within each partition and the parameters. CPU memory checker 420 also updates the inventory of CPU memory 402 to indicate the access of the formerly missing partitions.

When signaled as described above, query operation manager 528 runs the query against the partitions of data it was assigned in GPU memory 502 and stores the results into GPU memory 502. Query operation manager 528 checks the query for a group-by clause, and if no group by clauses is identified, query operation manager 528 provides a pointer to the results in GPU memory 502 and the parameters to context switch manager 544. Otherwise, query operation manager 528 provides the pointer to the results and the parameters to group by manager 542, which generates a partial results table using the group-by criteria as described above, and stores a pointer to the partial results table and a pointer to the results into GPU memory 502. When all such pointers have been stored (as indicated by the number of pointers matching the number of GPUS), one group by manager 542, such as the one that uses the primary GPU, combines the results as described above into GPU memory 502, sets a flag that it adds to the parameters, and the GPU 500 containing that group by manager 542, performs all subsequent processing described as being performed by a GPU below, or each group by manager 542 of each GPU 500 combines the results from a portion of the partial results table as described above and stores the results in GPU memory 502. Group by manager 542 provides a pointer to the combined results and the parameters to context switch manager 544. If the results are not combined at this point, each GPU continues processing as described herein.

When signaled, context switch manager 544 switches context to a graphics API as described above and provides the pointer and the parameters to shader manager 546. When it receives the pointer and the parameters, shader manager 546 uses such information to identify whether a stored shader program is available for the combination of parameters, and optionally the type of data corresponding to the pointer it receives. In one embodiment, the type of data is specified by the parameters, and in another embodiment it may be retrieved from metadata by CPU relevant column identifier 410 and passed from CPU relevant column identifier 410 as part of the parameters as described above until it reaches shader manager 546. If shader manager 546 locates a usable stored program, shader manager 546 optionally updates the modifiable attributes of the stored program based on the parameters and data types it receives and signals shader run manager 562 with a pointer to the shader, the pointer to the results it received, and the parameters. Otherwise, a shader corresponding to the parameters and data types is built and compiled by shader manager as described above 546. Shader manager 546 stores the shader into GPU storage 502 and signals shader run manager 562 with a pointer to the shader, the pointer to the results it received, and the parameters. In one embodiment, if the flag is set at the time shader manager 546 receives the information described above, the shader manager 546 of only one GPU (such as the primary GPU) operates to provide the shader and distributes via GPU memory 502 the pointer to the shader to the other shader managers 546. In one embodiment, the portion of shader manager 546 that provides the shader as described operates on a CPU 400 and communicates with the portion of shader manager 546 on GPU 500 and one or both portions may transfer the shader from CPU memory 402 to GPU memory 502.

When it receives the pointer to the shader, the pointer to the results it received, and the parameters, shader run manager 562 reserves in GPU storage an image buffer using the image size parameter it receives, and provides the pointer to the shader, pointer to the buffer and pointer to the results to the graphics API, such as OpenGL. If multiple GPUs are operating at this point, each shader run manager 562 performs this function and operates on the results it is processing.

The graphics program 564, such as OpenGL that provides the API, generates the Z-Buffer texture and renders the image into the buffer using the shader from the results corresponding to the pointer, and produces an ID map as described above and stores the row identifier with each pixel in the ID map, all in GPU memory 502, and provides pointers to the Z-buffer texture, and the ID map to shader run manager 562. The version produced by each GPU is also described herein as a section.

When it receives such information, if there is one shader run manager 562 operating as indicated by the flag in the parameters, that shader run manager 562 operating provides the pointers to the buffer, the z-buffer texture and the ID map and the parameters to convolutional filter manager 574 on a GPU or on all GPUs. Otherwise each shader run manager 562 provides the pointers to the buffer, the Z-buffer texture and the ID map and the parameters to assembly determination manager 570.

When it receives the pointers to the buffer, the z-buffer texture and the ID map, assembly determination manager 570 identifies whether the GPU data overlaps as described above. If so, it provides the pointers to the buffer, the z-buffer texture and the ID map, and the parameters, to assembly manager 572 on the primary GPU or assembly manager 472 on the primary CPU (in which case either assembly determination manager 570 or assembly manager 472 moves the buffer, the z-buffer texture and the ID map to CPU memory 402). Assembly manager 472 or 572 assembles the portions of the buffer into a single buffer using the Z-buffer texture, and builds a single ID map if it was not already consolidated. Assembly manager 472 or 572 sets the flag and adds it to the parameters, and assigns an image ID and adds it to the parameters. Assembly manager 472 or 572 provides the pointers to the buffer and the ID map and the parameters to convolutional filter manager 574 on the primary GPU or convolutional filter manager 474 on the primary CPU. If assembly determination manager 570 determines the GPU data does not overlap as described above, assembly determination manager 570 provides the pointers to the buffer, the Z-buffer texture and the ID map, and the parameters to convolutional filter manager 574.

When it receives the pointers to the buffer, optionally, the Z-buffer texture, and the ID map, and the parameters, each convolutional filter manager 574 or 474 (if only one GPU or CPU is processing at this point, there is only one such convolutional filter manager 574 or 474 and it performs the functions described here) checks to see if there is a convolutional filter to be applied as specified by the parameters, and if so, expands the sections as described above and applies the convolutional filter or filters specified by the parameters. If the flag in the parameters is set, the sections need not be expanded. If the flag is set, convolutional filter manager 574 or 474 provides the pointers to the buffer and ID map, and the parameters to compositor manager 476 or 576 and otherwise provides the pointers to the buffer, ID map and the z-buffer texture and parameters to assembly manager 572 or 472 with an indication that any convolutional filters have been applied.

If it receives such indication and other information, assembly manager 572 or 472 assembles the portions into a single buffer as described above, assigns an image identifier, and provides the pointer to the buffer, pointer to the ID map, and the parameters to compositor manager 476 or 576. Compositor manager 576 or 476 then composites the buffer and ID map onto the final framebuffer. The composite operation performed is specified by the request parameters, and is usually an OVER composite operation. Composite operations are described at numerous web sites located by searching "composite operations" (for example, the web site: developer dot mozilla dot org/en-US/Web/API/CanvasRenderingContext2D/globalCompositeOperation describes numerous composite operations that can be performed by an HTML canvas object). Following the composite of the layer, a flag is set to notify CPU request receiver 408 to process the next layer and its respective query and data source and CPU request receiver 408 complies. When all layers and their respective queries have been processed and composited, either composite manager 576 or image compression manager 490 copies the buffer and ID map from GPU memory 502 to CPU memory 402 if such information is still in GPU memory 502.

When it receives the pointer to the buffer and ID map and the image identifier, image compression manager 490 compresses the image or frame of the animation as described above, stores the ID map in CPU memory 402 or long term storage 310 associated with the image ID and the source from the parameters and provides the rendered image or frame with the image identifier to a browser or navigation or other program on user computer system 308. The image or frame is a visualization (e.g. a plot, such as a graph) of the results of the queries performed against their data source or data sources. The IP address and port used to send the image or frame may be one associated with the initial request received by CPU request receiver 408, either because it was received with the request as part of the parameters, and was forwarded to image compression manager 490 or it may be held by a different process on CPU 400 that received a different request that caused the different process to generate the request received by CPU request receiver 408 and the image or frame may be provided to user computer system via that different process.

As noted above, the browser, navigation or other program on user system 308 displays the image or frame and detects a hovering or click using a mouse or other pointing object corresponding to a cursor it displays. When it detects the user hovering or receives a pointing device click, the program provides the image identifier, optionally field information and optionally the action performed (click or hover) and the coordinates corresponding to the hover or click to CPU request receiver 408, which forwards it to row data manager 496. In one embodiment, the image identifier is the user's IP address and port that was used to send the API request, and in another embodiment, the image identifier is a sequentially-issued unique identifier.

When it receives the image identifier, and any of the other optional information from computer system 308, row data manager 496 uses the image identifier to locate the ID map, and then uses the ID map to identify the row in the source database corresponding to the click or hover. Row data manager 496 returns some or all of the data from the row, based on any field information received (e.g. returning only the fields specified in the field information, if received). Row data manager 496 may provide different data or provide data differently based on any action information it receives, for example providing more or less data if the action is a click than if the action is a hover. More or less data may include more or fewer fields from a row or more or fewer rows, or both. Any number of clicks or hovers may be received and responded to in this fashion and any number of requests may be processed from any number of user computer systems 308 as described herein.

Each system element may include a conventional hardware processor or hardware processor system or processor system or processor that is coupled to a hardware memory or hardware memory system or memory or memory system, each of these being conventional in nature. The processor system may be a CPU (central processor unit) or GPU (graphics processing unit, such as would be found in many multiples on a graphics card. All system elements are structural: the only nonce word to be used herein is "means". Each system element described herein may include computer software or firmware running on a conventional computer system or the portion indicated thereof: either CPU or GPU. Each system element labeled "storage" may include a conventional computer storage such as memory or disk and may include a conventional database. Each system element may contain one or more inputs, outputs and/or input/outputs to perform the functions described herein. Any system element may incorporate any of the features of the method and vice versa. The various elements that are not memory or other storage of CPU system 400 or GPU system 500 may include the same CPU or GPU, respectively, with different software, running at different times. There may be many CPU systems 400 and many, many GPU systems, with the GPU systems running simultaneously until processing is performed by a single one as described. Each CPU system and GPU system may operate as described herein.

Completion manager 473 includes assembly manager 472 and convolutional filter manager 474 and completion manager 573 includes assembly manager 572 and convolutional filter manager 574. Other elements may be grouped, with the group separately named.

Certain Embodiments

Described is a method of displaying results of a request, including:

receiving the request including at least one query and one or more parameters describing, for each of the at least one query, how to display the results of the at least one query to be performed using at least one data set;

allocating different portions of each of the at least one data set to different ones of one or more graphics processing units;

performing the query at each of the graphics processing units in the plurality using the portions of the data set allocated to such graphics processing unit to produce a set of results;

at each of the one or more graphics processing units, causing to be graphically at least partly rendered in accordance with at least one of the parameters the set of results of the query performed using the portions of the data set allocated to said graphics processing unit;

combining the at least partly rendered results from each of the one or more graphics processing units;

completing the graphical rendering of the combined results if such combined results were only partly rendered; and providing for display the combined rendered results.

The method may include an optional feature, whereby the portions of the data sets allocated were divided into such portions before the request was received.

The method may include an optional feature, whereby the completing the rendering step is performed by a single one of the one or more graphics processing units based on a size of a memory of the single one of the one or more graphics processing units being not smaller than a size of a memory of each of the other of the one or more graphics processing units.

The method may include an optional feature, whereby a sequence at which the combining step is performed is based on at least one of the one or more parameters indicating the at least partly rendered results from one graphics processing unit in the plurality has a potential to overlap the at least partly rendered results from another graphics processing unit in the plurality.

The method may include an optional feature, whereby the completing the graphical rendering step is at least partly performed at each of the one or more graphics processing units, responsive to the graphically at least partly rendered query results from other graphics processing units based on at least one of the one or more parameters.

The method may include an optional feature, whereby the causing to be graphically at least partly rendered step is performed without copying the set of results in a memory of the respective graphics processing unit.

The method may include an optional feature, whereby causing to be graphically at least partly rendered the results of the query comprises selecting one of one or more shader programs.

The method may include an optional feature, whereby causing to be graphically at least partly rendered the results of the query additionally comprises providing parameters to the shader program selected based on at least one of the one or more parameters.

Described is a system for displaying results of a request, including:

a CPU request receiver including a central processing unit of a computer system having an input for receiving the request including at least one query and one or more parameters describing, for each of the at least one query, how to display the results of the at least one query to be performed using at least one data set, the CPU request receiver for providing at an output the at least one query and the one or more parameters;

a CPU partition assigner having an input for receiving information about the at least one data set, the CPU partition assigner for producing and providing at an output an allocation of different portions of each of the at least one data set to different ones of one or more graphics processing units;

one or more query operation managers, each including a different one of the one or more graphics processing units, each having an input coupled to the CPU request receiver for receiving the query and to the CPU partition assigner output for receiving at least a portion of the allocation, each query operation manager for performing at least some of the at least one query using the portions of the data set allocated to such graphics processing unit and received at the query operation manager input to produce a set of results, and for providing the set of results at an output;

one or more shader run managers, each including a different one of the one or more graphics processing units, each having an input coupled to the query operation manager including the graphics processing unit that said graphics rendering manager comprises for receiving the set of results and to the CPU request receiver for receiving at least one of the one or more parameters, each shader run manager for causing, on the graphics processing unit including said shader run manager, the set of results of the query performed to be graphically at least partly rendered using the set of results received at the said shader run manager input and the at least one of the parameters to cause to be produced via an output at least partly rendered results, the at least partly rendered results;

an assembly manager including a graphics processing unit or a central processing unit, having an input coupled for receiving the at least partly rendered results produced from operation of each of the one or more shader run managers, the assembly manager for combining the at least partly rendered results received at the assembly manager input and providing at an output the combined at least partly rendered results;

a completion manager including a graphics processing unit or a central processing unit having an input coupled to the assembly manager output for receiving the combined at least partly rendered results, and to the CPU request receiver output for receiving at least one selected from a group including the query and at least one of the parameters in the plurality if the combined at least partly rendered results were only partly rendered, the completion manager for, if the combined at least partly rendered results were only partly rendered, completing the graphical rendering of the combined results to produce completed combined results, and for providing at an output the completed combined results; and an image compression manager having an input coupled to the assembly manager output for receiving the combined at least partly rendered results or to the completion manager output for receiving the completed combined results, the image compression manager for providing at an output for display the combined at least partly rendered results or the completed combined results.

The system may include an optional feature, whereby the portions of the data sets allocated were divided into such portions before the request was received.

The system may include an optional feature, whereby the graphics processing unit including the completion manager is identified by the CPU request receiver from the one or more graphics processing units based on a size of a memory of said graphics processing unit being not smaller than a size of a memory of each of the other of the one or more graphics processing units.

The system may include an optional feature, whereby the one or more shader run managers causes the at least partly rendered results to be produced based on at least one of the one or more parameters indicating the at least partly rendered results produced on one graphics processing unit in the plurality has a potential to overlap the at least partly rendered results produced on another graphics processing unit in the plurality.

The system may include an optional feature, whereby the completion manager completes the graphical rendering of the combined results by applying a convolutional filter.

The system may include an optional feature, whereby the one or more shader run managers causes the set of results to be graphically at least partly rendered without the set of results being copied in a memory of the respective graphics processing unit.

The System:
may additionally include, at least one shader manager, each having an input coupled to the CPU request receiver for receiving at least one selected from a group including at least some of the parameters and the query, each shader manager for selecting one of one or more shader programs responsive to at least one of the group including at least some of the parameters and the query, and for providing at an output an identifier of the shader program selected; and may include an optional feature, whereby:
each of the one or more shader run manager inputs is additionally coupled to the shader manager output for receiving the identifier of the shader program; and
each of the one or more the shader run managers causes the set of results of the query performed to be graphically at least partly rendered additionally using the shader program corresponding to the identifier received at said graphics program input.

The system may include an optional feature whereby the shader manager is additionally for configuring via an input/output the shader program selected in accordance with the group including the at least some of the parameter and the query.

Described is a computer program product including a non-transitory computer useable medium having computer readable program code embodied therein for displaying results of a request, the computer program product including computer readable program code devices configured to cause a computer system to:
receive the request including at least one query and one or more parameters describing, for each of the at least one query, how to display the results of the at least one query to be performed using at least one data set;
allocate different portions of each of the at least one data set to different ones of one or more graphics processing units;
perform the query at each of the graphics processing units in the plurality using the portions of the data set allocated to such graphics processing unit to produce a set of results;
at each of the one or more graphics processing units, cause to be graphically at least partly rendered in accordance with at least one of the parameters the set of results of the query performed using the portions of the data set allocated to said graphics processing unit;
combine the at least partly rendered results from each of the one or more graphics processing units;
complete the graphical rendering of the combined results if such combined results were only partly rendered; and
provide for display the combined rendered results.

The computer program product may include an optional feature, whereby the portions of the data sets allocated were divided into such portions before the request was received.

The computer program product may include an optional feature, whereby the computer readable program code devices configured to cause the computer system to complete the rendering cause such completion to be performed by a single one of the one or more graphics processing units based on a size of a memory of the single one of the one or more graphics processing units being not smaller than a size of a memory of each of the other of the one or more graphics processing units.

The computer program product may include an optional feature, whereby a sequence at which the combining step is performed is based on at least one of the one or more parameters indicating the at least partly rendered results from one graphics processing unit in the plurality has a potential to overlap the at least partly rendered results from another graphics processing unit in the plurality.

The computer program product may include an optional feature, whereby the computer readable program code devices configured to cause the computer system to complete the graphical rendering cause it to be at least partly performed at each of the one or more graphics processing units, responsive to the graphically at least partly rendered query results from other graphics processing units based on at least one of the one or more parameters.

The computer program product may include an optional feature, whereby the computer readable program code devices configured to cause the computer system to cause to be graphically at least partly rendered, cause such function to be performed without copying the set of results in a memory of the respective graphics processing unit.

The computer program product may include an optional feature, whereby the computer readable program code devices configured to cause the computer system to cause to be graphically at least partly rendered the results of the query comprise computer readable program code devices configured to cause the computer system to select one of one or more shader programs.

The computer program product may include an optional feature, whereby the computer readable program code devices configured to cause the computer system to cause to be graphically at least partly rendered the results of the query additionally comprises computer readable program code devices configured to cause the computer system to provide parameters to the shader program selected based on at least one of the one or more parameters.

APPENDIX A

Shader Writing Description

Imagine a case in which what is received is a SQL query and then a rendering specification that dictates how the results of that SQL query should be transformed into a visual image.

The specification provides the rendering engine the following information:
A. The width and height of the desired image
B. The type(s) of visual marks that are to be generated, for example dots, lines, polygons, etc.
C. For each of the mark types, we produce a mapping between the projected attributes of the SQL query, i.e. the select a, b, c from table part and the visual attributes needed to define the given mark.
  For example, imagine we wanted to draw a scatterplot.
    We produce a mandatory mapping of two data attributes (columns) to "x" and "y" attributes
    We can accept optional mapping of three more data attributes to size, color and opacity. When the user does not specify a mapping for a particular data attribute we can provide a default value
D. For each of these mappings we also provide a scale.
  For example, imagine we are plotting a geospatial map of US political donations and want them to be represented as dots colored by the political party of the recipient and sized by the amount of the donation
    For the x and y attributes we might use a scale to linearly map longitude and latitude attributes/columns in the SQL table to pixel coordinates, i.e. from pixel 0 to the width/height of the image
    For the color attribute we can use an ordinal scale to map the points where political_party='Republican' to red, political_party='Democrat' to blue and political_party='Green' to green
    For the size attribute we can use a continuous quantitative scale to map donation amounts of 0 to 2500 dollars to circle radius' ranging from 2 to 10 pixels.
    For the opacity attribute we might specify that this is a constant 0.7 for all marks Given the specification and with knowledge of the SQL types of the query result set we can construct a graphics API shader program to transform the SQL results into a visual image according to the rendering specification outlined above.

If we have not seen this type of query/rendering spec before, we can generate and compile the Graphics API source code to implement the rendering on-the-fly and then compile it.

Depending on the type of marks desired, we will use the corresponding shader source code for drawing modes (points, lines, polygons, sprites), as the starting point for the final shader source.

The program/shader is then constructed by taking each input variable—applying an optional scale transformation to it, and then outputting the correct result for the position in program's vertex shader and the color/alpha channel in the program's fragment shader.

In general constants such as those used for scale domains or ranges can be parameterized as arguments to the program/shader. For example, the linear scale mapping donation amounts to circle radius can be parameterized with m and b in the formula $y=mx+b$. Then if the scale changes, for example if we want to generate circles from 2 to 20 pixels in radius, we do not need to regenerate/recompile the shader/program and can use the previously generated shader program with the arguments suitably changed.

After a program/shader is generated the compiled byte code is cached in a dictionary that maps the input specifications, including types of the variables and drawing mode, to the compiled source code for that program/shader such that it can be reused. In general this means that there is a slight overhead when the software encounters a novel rendering specification or SQL types as it needs to generate the program from scratch—however it can use that program thereafter even if the user changes the scale or other input parameters.

What is claimed is:
1. A system for displaying results of a request, comprising:
  a CPU request receiver, comprising one of at least one central processing unit of a computer system, the CPU request receiver having an input for receiving the request comprising at least one query and a plurality of parameters describing, for each of the at least one query, how to display the results of said query to be performed using at least one data set, the CPU request receiver for providing at an output the at least one query and the plurality of parameters;
  a CPU partition assigner having an input for receiving information about the at least one data set, the CPU partition assigner for producing and providing at an output an allocation of different portions of each of the at least one data set to different ones of a plurality of graphics processing units;

a plurality of query operation managers, each comprising a different one of the plurality of graphics processing units, each having an input coupled to the CPU request receiver output for receiving the at least one query and to the CPU partition assigner output for receiving at least a portion of the allocation, each query operation manager for performing at least some of the at least one query using the portions of the at least one data set allocated to such graphics processing unit and received at the query operation manager input, to produce a set of results, and for providing the set of results at an output;

a plurality of shader run managers, each comprising a different one of the plurality of graphics processing units, each shader run manager having an input coupled to the output of the query operation manager comprising the graphics processing unit that said shader run manager comprises, for receiving the set of results and to the CPU request receiver output for receiving at least one of the plurality of parameters, each shader run manager for causing, on the graphics processing unit comprising said shader run manager, the set of results of the query performed to be graphically at least partly rendered using the set of results received at the said shader run manager input and the at least one of the parameters to cause to be produced via an output at least partly rendered results;

an assembly manager comprising one of the plurality of graphics processing units in the plurality or one of the at least one central processing unit, the assembly manager having an input coupled for receiving the at least partly rendered results produced from operation of each of the plurality of shader run managers, the assembly manager for combining the at least partly rendered results received at the assembly manager input and providing at an output the combined at least partly rendered results;

a completion manager comprising one of the plurality of the graphics processing units or one of the at least one central processing units, the completion manager having an input coupled to the assembly manager output for receiving the combined at least partly rendered results, and to the CPU request receiver output for receiving at least one selected from a group comprising the query and at least one of the parameters in the plurality if the combined at least partly rendered results were only partly rendered, the completion manager for, if the combined at least partly rendered results were only partly rendered, completing a graphical rendering of the combined results to produce completed combined results, and for providing at an output the completed combined results; and an image compression manager having an input coupled to the assembly manager output for receiving the combined at least partly rendered results or to the completion manager output for receiving the completed combined results, the image compression manager for providing at an output for display, the combined at least partly rendered results or the completed combined results.

2. The system of claim 1, wherein the portions of the at least one data set allocated were divided into such portions before the request was received.

3. The system of claim 1, wherein the graphics processing unit comprising the completion manager is identified by the CPU request receiver from the plurality of graphics processing units based on a size of a memory of said identified graphics processing unit being not smaller than a size of a memory of each of the other of the plurality of graphics processing units.

4. The system of claim 1, wherein the plurality of shader run managers causes the at least partly rendered results to be produced based on at least one of the plurality of parameters indicating the at least partly rendered results produced on one graphics processing unit in the plurality has a potential to overlap the at least partly rendered results produced on another graphics processing unit in the plurality.

5. The system of claim 1, wherein the completion manager completes the graphical rendering of the combined results by applying a convolutional filter.

6. The system of claim 1, wherein the plurality of shader run managers causes the set of results to be graphically at least partly rendered without the set of results being copied in a memory of the respective graphics processing unit.

7. The system of claim 1:

additionally comprising, at least one shader manager, each having an input coupled to the CPU request receiver output for receiving at least one selected from a group comprising at least some of the plurality of parameters and the query, each shader manager for selecting one of a plurality of shader programs responsive to at least one of the group comprising at least some of the plurality of parameters and the query, and for providing at an output an identifier of the shader program selected; and wherein:

each of the plurality of shader run manager inputs is additionally coupled to the output of at least one of the at least one shader manager for receiving the identifier of the shader program; and each of the plurality of the shader run managers causes the set of results of the query performed to be graphically at least partly rendered additionally using the shader program corresponding to the identifier received at said shader run manager input.

8. The system of claim 7, wherein the shader manager is additionally for configuring via an input/output the shader program selected, in accordance with the group comprising the at least some of the plurality of parameters and the query.

* * * * *